United States Patent
Cannon

(10) Patent No.: US 7,770,913 B2
(45) Date of Patent: Aug. 10, 2010

(54) COLLAPSIBLE TRAILER AND METHOD FOR USE OF SAME

(76) Inventor: John Cannon, 286 Taylor George, Longview, TX (US) 75605

( * ) Notice: Subject to any disclaimer, the term of this patent is extended or adjusted under 35 U.S.C. 154(b) by 278 days.

(21) Appl. No.: 11/869,667

(22) Filed: Oct. 9, 2007

(65) Prior Publication Data

US 2008/0084037 A1  Apr. 10, 2008

Related U.S. Application Data

(60) Provisional application No. 60/828,410, filed on Oct. 6, 2006.

(51) Int. Cl.
B62B 1/00 (2006.01)

(52) U.S. Cl. .............. 280/656; 280/638; 280/639; 280/649; 280/278; 280/35

(58) Field of Classification Search .............. 280/30, 280/35, 39, 42, 43, 43.1, 415.1, 489, 492, 280/638, 639, 649, 651, 652, 655, 656, 659, 280/762, 769; 224/519, 520, 521
See application file for complete search history.

(56) References Cited

U.S. PATENT DOCUMENTS

| 226,667 | A | * | 4/1880 | Mccall | 280/43 |
|---|---|---|---|---|---|
| 228,916 | A | * | 6/1880 | Edwin | 280/43 |
| 567,159 | A | * | 9/1896 | Peirce | 224/432 |
| 1,031,818 | A | * | 7/1912 | Putman | 182/116 |
| 1,319,235 | A | * | 10/1919 | Messersmith | 280/659 |
| 1,429,849 | A | * | 9/1922 | Dolge | 280/640 |
| 1,431,862 | A | * | 10/1922 | Allebrand et al. | 280/651 |
| 1,539,986 | A | * | 6/1925 | Beatty | 280/35 |
| 1,771,836 | A | * | 7/1930 | Beckham et al. | 280/640 |
| 2,020,766 | A | * | 11/1935 | Brown | 280/639 |
| 2,764,448 | A | * | 9/1956 | Andersson | 296/181.7 |
| 3,093,386 | A | * | 6/1963 | Case | 280/42 |
| 3,210,089 | A | * | 10/1965 | Hoffman et al. | 280/43 |
| 3,367,675 | A | * | 2/1968 | Gearin | 280/639 |
| 3,407,959 | A | * | 10/1968 | Mondineu | 220/6 |
| 3,664,459 | A |  | 5/1972 | Stephens et al. |  |
| 3,702,033 | A | * | 11/1972 | Coleman | 40/541 |
| 3,912,290 | A |  | 10/1975 | Rich |  |
| 3,934,770 | A |  | 1/1976 | Larsen |  |
| 4,175,768 | A | * | 11/1979 | Thackray | 280/652 |
| 4,283,068 | A |  | 8/1981 | Keyser et al. |  |
| 4,522,420 | A | * | 6/1985 | Hannappel | 280/755 |
| 4,593,840 | A | * | 6/1986 | Chown | 224/520 |
| 4,754,998 | A | * | 7/1988 | LeJuerrne | 296/173 |
| 5,244,001 | A | * | 9/1993 | Lynch | 135/145 |

(Continued)

Primary Examiner—Paul N Dickson
Assistant Examiner—Brodie Follman
(74) Attorney, Agent, or Firm—Scott T. Griggs; Griggs Bergen LLP

(57) ABSTRACT

A collapsible trailer and method for use of the same are disclosed. In one embodiment, the collapsible trailer includes a jointed lattice-work frame of scissor linkages which in the expanded position provide an open enclosure for transporting the load. Two orthogonally positioned collapsible crossbars span the open enclosure and releasably engage the lattice-work frame. A meshed netting is superposed to the collapsible crossbars and releasably coupled to the lattice-work frame. The collapsible trailer may be configured in a collapsed position for easy storage when not in use by removing the meshed netting, releasing the collapsible crossbars, and slidably collapsing the collapsible crossbars lengthwise and width wise in an accordion fashion.

20 Claims, 8 Drawing Sheets

U.S. PATENT DOCUMENTS

| | | | |
|---|---|---|---|
| 5,249,823 A * | 10/1993 | McCoy et al. | 280/656 |
| 5,290,050 A * | 3/1994 | Kim | 280/42 |
| 5,722,905 A * | 3/1998 | Bidelman | 473/451 |
| 5,806,878 A * | 9/1998 | Mroczka et al. | 280/653 |
| 5,810,374 A | 9/1998 | Small | |
| 6,039,333 A | 3/2000 | Hamblin | |
| 6,042,128 A * | 3/2000 | Dinkins | 280/47.18 |
| 6,092,817 A * | 7/2000 | Kilmer | 280/47.26 |
| 6,109,644 A * | 8/2000 | Cox | 280/652 |
| 6,276,698 B1 | 8/2001 | Calandra | |
| 6,354,619 B1 * | 3/2002 | Kim | 280/651 |
| 6,428,035 B1 * | 8/2002 | Maxwell et al. | 280/656 |
| 6,460,653 B1 | 10/2002 | Hardy | |
| 6,491,318 B1 * | 12/2002 | Galt et al. | 280/651 |
| 6,585,285 B2 * | 7/2003 | Koch | 280/656 |
| 6,773,025 B1 * | 8/2004 | Zelm | 280/656 |
| 6,929,230 B2 * | 8/2005 | Tsai | 248/436 |
| 7,052,033 B2 * | 5/2006 | McDonell | 280/656 |
| 7,073,816 B1 * | 7/2006 | Larson et al. | 280/656 |
| 7,083,184 B2 * | 8/2006 | Sawyer | 280/656 |
| 7,097,182 B1 * | 8/2006 | Liu | 280/42 |
| 7,316,339 B2 * | 1/2008 | Zhang | 224/499 |
| 7,510,208 B1 * | 3/2009 | Lochmueller | 280/650 |
| 2002/0070532 A1 * | 6/2002 | Harrison et al. | 280/647 |
| 2003/0062707 A1 * | 4/2003 | Koch | 280/401 |
| 2003/0173758 A1 * | 9/2003 | Badger et al. | 280/656 |
| 2004/0020955 A1 * | 2/2004 | Darby | 224/485 |
| 2004/0100045 A1 * | 5/2004 | Amacker | 280/30 |
| 2004/0108688 A1 | 6/2004 | Holmes | |
| 2004/0135349 A1 * | 7/2004 | Palmer | 280/656 |
| 2005/0029776 A1 * | 2/2005 | Koch | 280/656 |
| 2005/0040613 A1 * | 2/2005 | Williams et al. | 280/30 |
| 2005/0093273 A1 * | 5/2005 | McDonell | 280/656 |
| 2005/0194765 A1 * | 9/2005 | Easterling | 280/656 |
| 2006/0038384 A1 * | 2/2006 | Cumbie | 280/656 |
| 2006/0151555 A1 * | 7/2006 | Mills | 224/509 |
| 2007/0252357 A1 * | 11/2007 | Hoskins | 280/415.1 |
| 2009/0066061 A1 * | 3/2009 | Winter et al. | 280/639 |

* cited by examiner

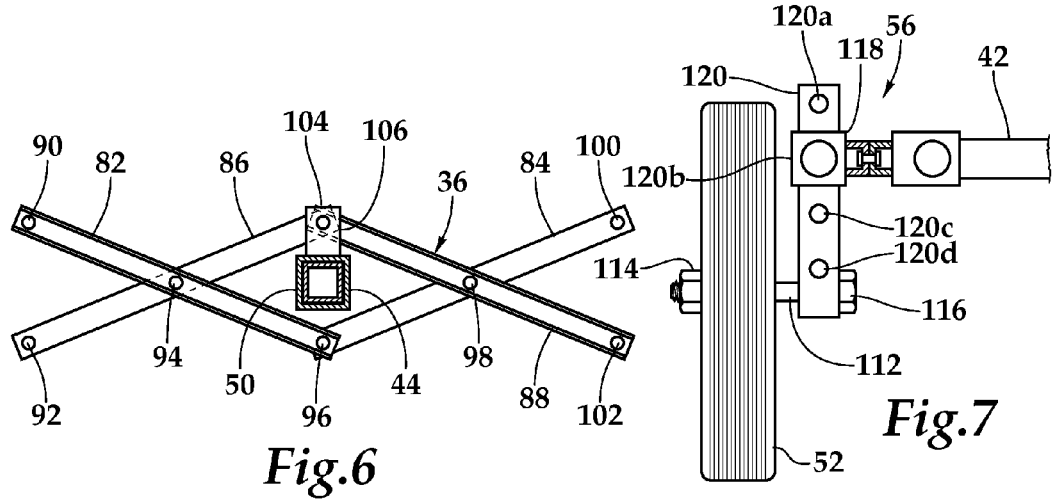
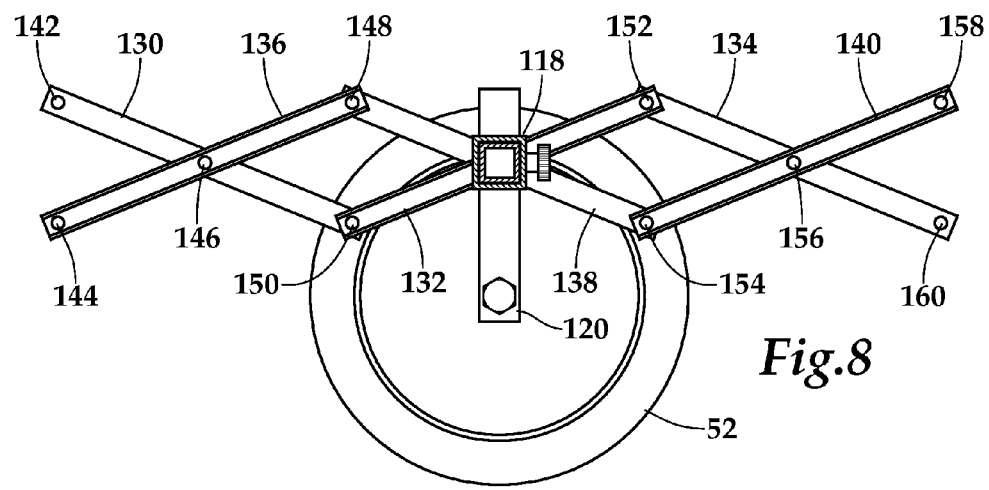
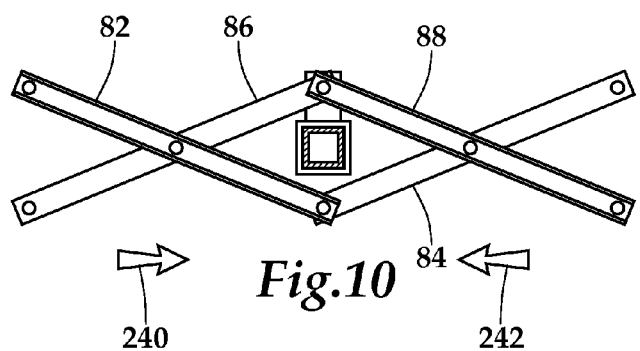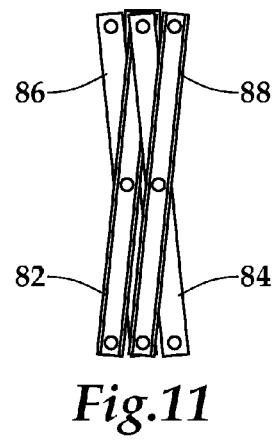

US 7,770,913 B2

COLLAPSIBLE TRAILER AND METHOD FOR USE OF SAME

PRIORITY STATEMENT & CROSS-REFERENCE TO RELATED APPLICATIONS

This application claims priority from co-pending U.S. patent application Ser. No. 60/828,410, entitled "Collapsible Trailer and Method for Use of Same" and filed on Oct. 6, 2006, in the name of John Cannon; which is hereby incorporated by reference for all purposes.

TECHNICAL FIELD OF THE INVENTION

This invention relates, in general, to convenient types of devices for readily carrying articles and, in particular, to a collapsible trailer that is adapted for the carrying of a load.

BACKGROUND OF THE INVENTION

Without limiting the scope of the present invention, its background will be described with reference to hunting of large game such as deer and comparably sized animals, as an example. Outdoorsmen and hunters frequent wilderness areas in search of game such as deer, elk, moose, and antelope. At the end of a successful hunting expedition, transporting the harvested animal from these remote locations is a major undertaking. The methods and equipment typically employed in such situations are often very crude.

For example, a hunter may simply drag the harvested animal back to a camp or other central location. This risks damaging the hide of the animal on exposed rocks and rough ground. By way of further example, the hunter may adopt a more sophisticated approach by loading the harvested animal onto a sled which is dragged by the hunter or attached to an all terrain vehicle (ATV). The use of the sled minimizes the damage to the hide of the harvested animal. Existing sleds, however, are quit large and cumbersome and, therefore, transporting a sled posses logistical problems. Accordingly, there is a continuing effort to develop a lightweight, collapsible structure for safely and efficiently removing a harvested animal from a remote wilderness area.

SUMMARY OF THE INVENTION

A lightweight, collapsible structure for safely and efficiently removing a harvested animal from the field or carrying a load is provided. It should be appreciated, however, that the lightweight, collapsible structure is not limited to hunting applications. By way of example, the collapsible trailer may be used to transport camping supplies, sports gear, laundry, groceries, and the like. In one embodiment, a wheeled, collapsible carrier or trailer is provided that may be towed behind a vehicle, such as an ATV, or implemented as a travois or a wagon. When not being used, the collapsible carrier may be collapsed for easy storage without the necessity of tools.

In one implementation, the collapsible trailer includes a jointed lattice-work frame of scissor linkages which in the expanded position provide an open enclosure for transporting the load. Two orthogonally positioned collapsible crossbars span the open enclosure and releasably engage the lattice-work frame. A meshed netting is superposed to the collapsible crossbars and releasably coupled to the lattice-work frame. The collapsible trailer may be configured in a collapsed position for easy storage when not in use by removing the meshed netting, releasing the collapsible crossbars, and slidably collapsing the collapsible crossbars lengthwise and width wise in an accordion fashion. It should be appreciated that other embodiments including methods for use of the collapsible trailer are disclosed herein.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 6 is a front interior plan view of the collapsible trailer taken along line 6-6 of FIG. 5;

FIG. 7 is a side interior plan view of the collapsible trailer taken along line 7-7 of FIG. 5;

FIG. 8 is a side interior plan view of the collapsible trailer taken along line 8-8 of FIG. 5;

FIG. 10 is a front exterior plan view of the collapsible trailer configured in an expanded position;

FIG. 11 is a front exterior plan view of the collapsible trailer configured in a collapsed position;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
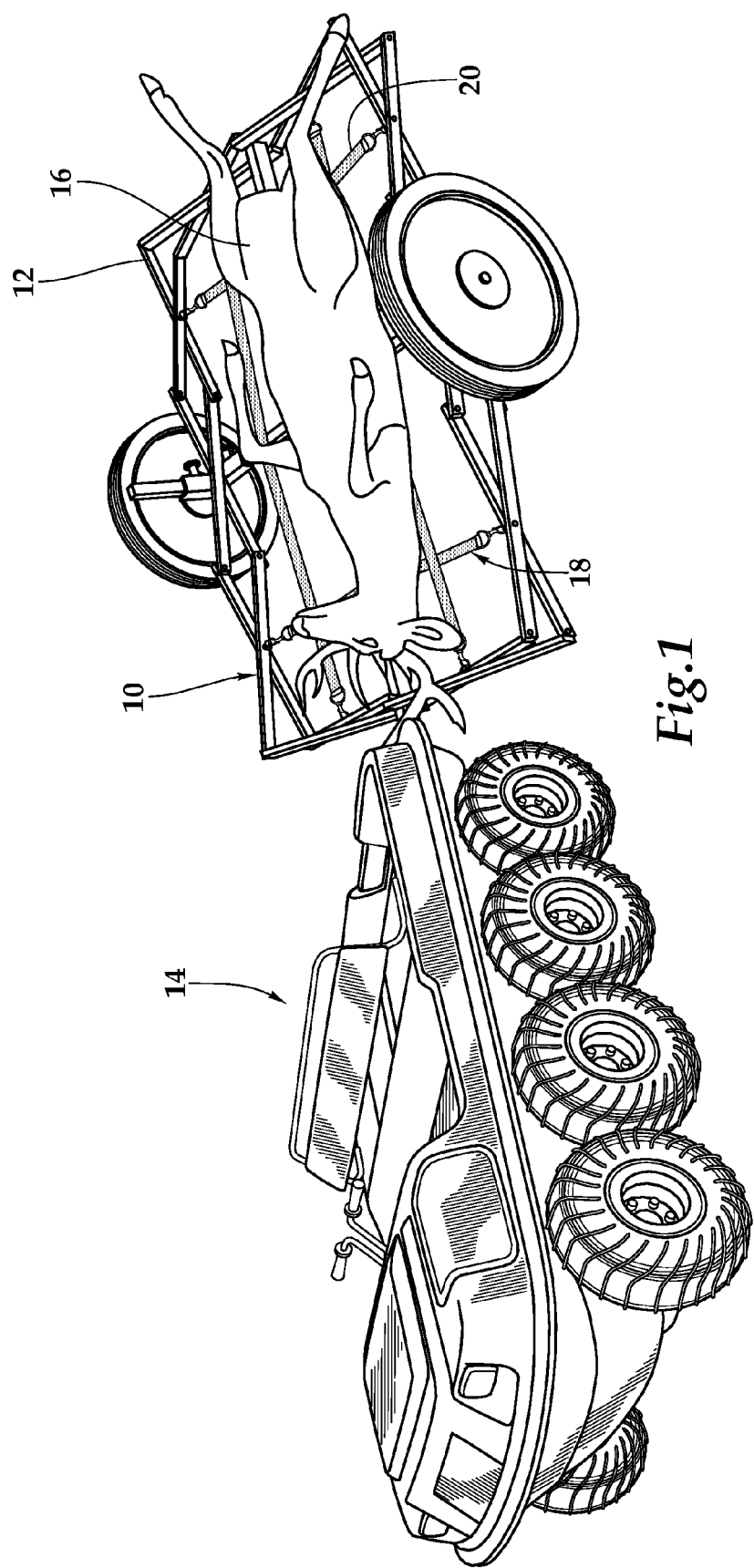
FIG. 1 is an environmental perspective view of one embodiment of a collapsible trailer in an expanded position that shows the collapsible trailer in operation carrying a deer as behind an ATV.
Figure 2:
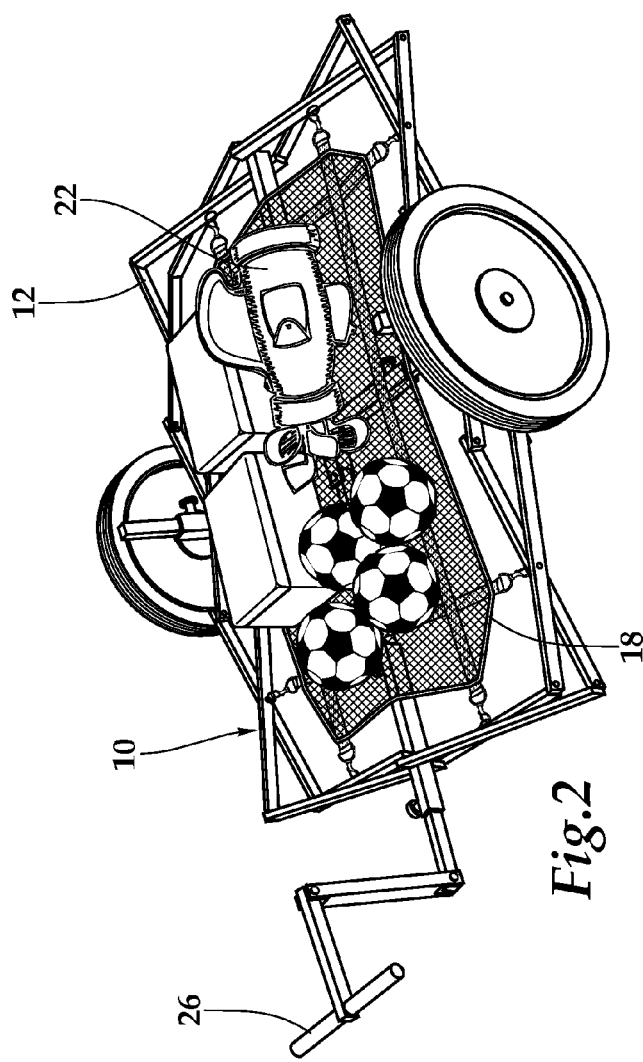
FIG. 2 is an environmental perspective view of another embodiment of the collapsible trailer in operation carrying a load.

Referring initially to FIG. 1, therein is depicted one embodiment of a collapsible trailer 10 in an expanded position 12. The collapsible trailer 10 is releasably coupled to an ATV 14 such that the ATV 14 is towing the collapsible trailer 10, which is being utilized to carry a harvested animal that is depicted as a deer 16 from a remote location in the field to a campsite or road, for example, for further processing and transportation. The deer 16 is being transported on a support platform 18 which comprises slats 20. It should be appreciated that although a deer is depicted, the collapsible trailer 10 presented herein may be used to carry other types of harvested animals as well as other types of cargo such as hunting or camping supplies, sports gear, laundry, groceries, and the like, for example. By way of further example, FIG. 2 depicts the collapsible trailer 10 carrying a load of sporting goods and related items, which are designated by number 22 on a support platform 18 which includes a meshed netting 24. Further, it should be appreciated that the collapsible trailer 10 may be towed by a variety of vehicles and, as an alternative, the collapsible trailer 10 may be towed by an animal, such as a horse, or even a person. As depicted in FIG. 2, a wagon handle 26 is coupled to the collapsible trailer 10 to enable pulling by a person.

Figure 4:
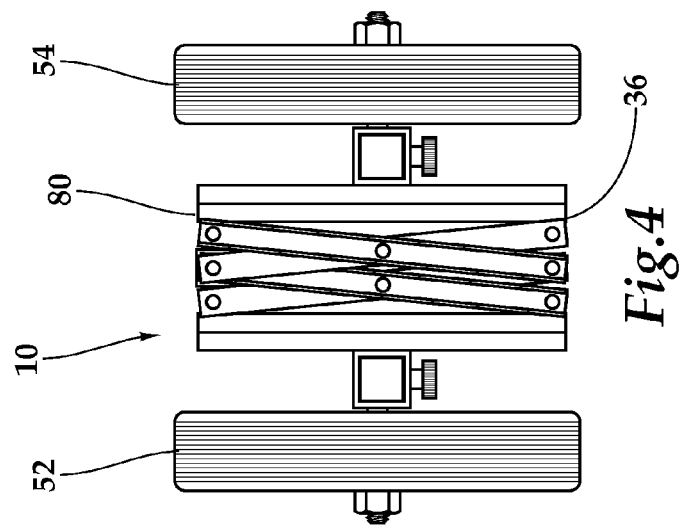
FIG. 4 is a front view of the collapsible trailer of FIG. 2 collapsed for storage.
Figure 3:
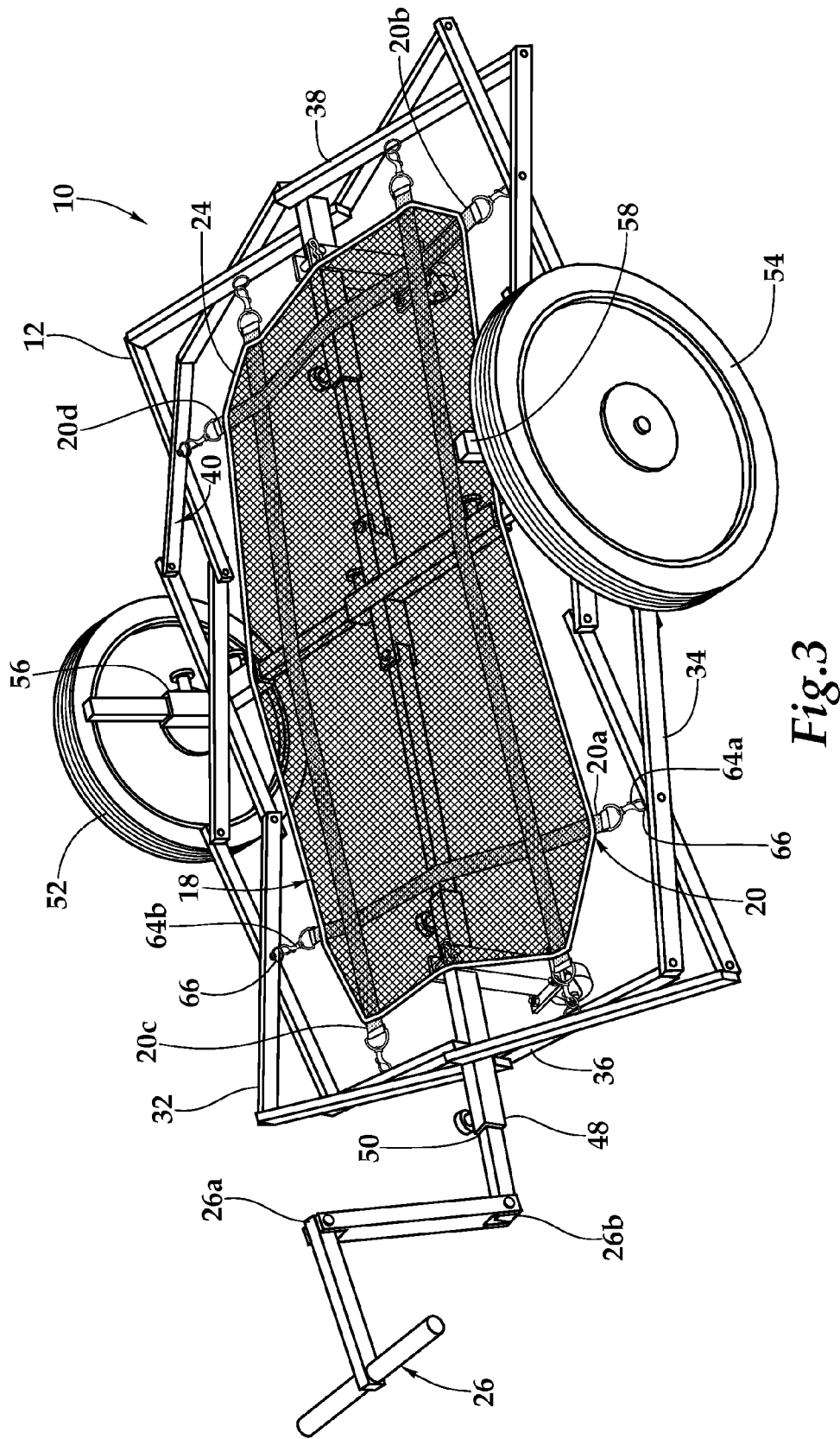
FIG. 3 is a perspective view of the collapsible trailer of FIG. 2 with a meshed netting installed.

Referring now to FIG. 3, in the illustrated expanded configuration 12, the collapsible trailer 10 has four sides (side 32, side 34, front 36, and rear 38) that with the support platform 18 define an open enclosure 40 for securely retaining a harvested animal as depicted in FIG. 1, sporting equipment and related items as depicted in FIG. 2, or another load in need of being transported. Each of the four sides 32-38 comprises a jointed lattice-work of scissor linkages which are expandable and collapsible in an accordion fashion. With reference to FIG. 4, a collapsed position 80 is depicted wherein the jointed lattice-work of the scissor linkages of the four sides 32-38 are collapsed in accordion fashion such that the collapsible trailer 10 may be easily stored.

Figure 5:
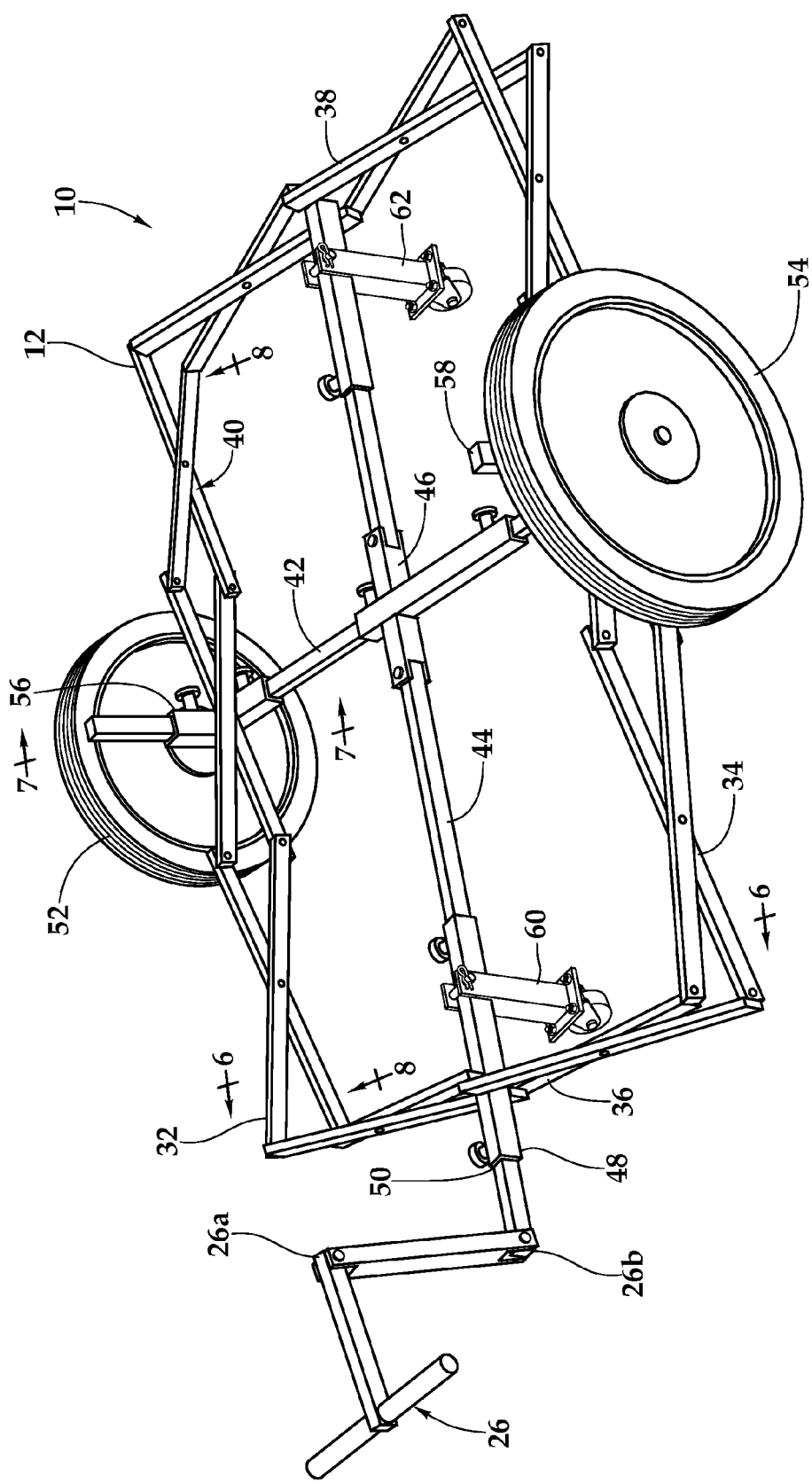
FIG. 5 is a perspective view of the collapsible trailer of FIG. 2 wherein the meshed netting is removed.

With reference to FIGS. 3 and 5, and particularly to FIG. 5 wherein the slats 20 and meshed netting 24 have been removed, the support platform 18 also comprises substantially orthogonal crossbars 42, 44 which intersect at junction 46 and interconnect the four sides 32-38 of the open enclosure 40 to provide support. More particularly, the crossbar 42 traverses the open enclosure 40 from the side 32 to the side 34 and the crossbar 44 traverses the open enclosure 40 from the front 36 to the rear 38. Each of the crossbars 42, 44 may be collapsible and/or telescoping to provide for easy storage and may comprise multiple components, as will be discussed in further detail hereinbelow. In one implementation, the crossbars 42, 44 (or portions thereof) and junction 32 are one or more telescoping and folding member having a plus "+" shape when in operation.

A hitch assembly 48 having a receptacle 50 is coupled to crossbar 44 and extends forward from the front 36 in order to removably secure the collapsible trailer 10 to a wagon handle 26 or conventional hitch ball, or other towing apparatus, extending from a rearward portion of an ATV such as ATV 12 of FIG. 1. The receptacle 50 formed at the end of the collapsible crossbar 44 is adapted to releasably accept any towing related accessory. By way of example, the hitch assembly 48 may comprise a traditional hitch, a collapsible hitch, or a rigid hitch. As depicted, in the embodiment using the wagon handle 26, articulated handle portions 26a and 26b form a foldable portion of the wagon handle 26 to provide a range of positions and heights for the wagon handle 26. Moreover, the articulated handle portions 26a and 26b create joints that are adapted to fold the wagon handle 26 potion of the collapsible crossbar 44 upon itself.

Two wheels 52, 54, which may be balance wheels, are coupled for rotation to wheel hub assemblies 56, 58 respectively positioned at the sides 32, 34. The crossbar 42, which is removable when collapsing the trailer 10, couples at each end to the wheel hub assemblies 56, 58. In an alternate embodiment, the wheels 52, 54 may be replaced by a pair of runners so that the collapsible trailer 10 slides instead of rolling. Such a transport option may be employed on surfaces with low friction, for example, surfaces such as snow, ice, or grassy surfaces that are not too dry. It should be appreciated that in accordance with the construction of the collapsible trailer 10, the runners are collapsible and/or disassembled also.

As shown, the support platform 18 includes slates 20a, 20b, 20c, and 20d which are superimposed over the crossbars 42, 44 and, as shown, secured to the expanded sides 32-38 of the jointed lattice-work. By way of example, slat 20a includes fasteners 64a, 64b disposed at opposite ends of the slat 20a to releasably connect with two eyelets 66 respectively disposed on the interior portions of sides 32, 34. It should be appreciated that the other slats utilize similar connection mechanisms, however, different connection techniques are within the teachings presented herein. As depicted, the meshed netting 24, which may be nylon or other material, is affixed to the slats 20. As depicted by FIG. 1, however, in particular embodiments only slats 20 are utilized and in still other embodiments, the meshed netting without the slats 20 may be employed.

FIG. 6 depicts the collapsible trailer as viewed along line 6-6 of FIG. 5. As discussed, the jointed lattice-work frame defines the four sides 32-38, each of which includes a plurality of scissor linkages configured in an expanded position. With reference to front 36, scissor linkages 82-88 are slidably expandable and collapsible in an accordion fashion between the expanded position 12 and the collapsed position 80. Exterior pivot points 90, 92 join the scissor linkages 82, 86 of the front 36 to the side 32. Interior pivot points 94, 96, 98, which may be pins, for example, provide pivotable linkages between the scissor linkages 82, 86; the scissor linkages 82, 84; and scissor linkages 84, 88, respectively, in order to enable expanding and folding. Exterior pivot points 100, 102 join the scissor linkages 84, 88 to the side 34. Interior pivot point 104 is adapted to join for folding scissor linkages 86, 88. Proximate to interior pivot point 104, a bracket 106 is disposed for receiving the collapsible crossbar 44. As shown, the collapsible crossbar 44 extends beyond an opening formed at the connection of the two scissor linkage units.

FIG. 7 depicts the collapsible trailer as viewed along line 7-7 of FIG. 5. The wheel hub assembly 56 includes an axle 112 coupled for rotation to wheel 52 and secured thereto by fastener 114. On an opposite end, fastener 116 secures the axle 112 to a vertical arm 120 having vertically spaced alignment holes providing positions 120a, 120b, 120c, and 120d. A height adjustment housing 118, which may include a bracket, having a mating pin mounted therethrough is adapted to slidably accept the vertical arm 120 therein in order to bring the housing 118 and vertical arm 120 into an adjustable mating engagement upon the alignment of one of the plurality of vertically spaced alignment holes providing a position 120a through 120d and the mating pin. The height and/or level of the collapsible trailer 10 may be manipulated for ease of use appropriately adjusting the height of the axles and wheels at the height adjustment housing 118 which may further comprise quick-snap components or a push-button arrangement, for example.

FIG. 8 depicts the collapsible trailer as viewed along line 8-8 of FIG. 5 in order to illustrated the jointed lattice-work frame and the plurality of scissor linkages in further detail. As shown, scissor linkages 130-140 are joined in the jointed lattice work frame by exterior pivot points 142, 144, interior pivot points 146-156, and exterior pivot points 158, 160.

Figure 9:
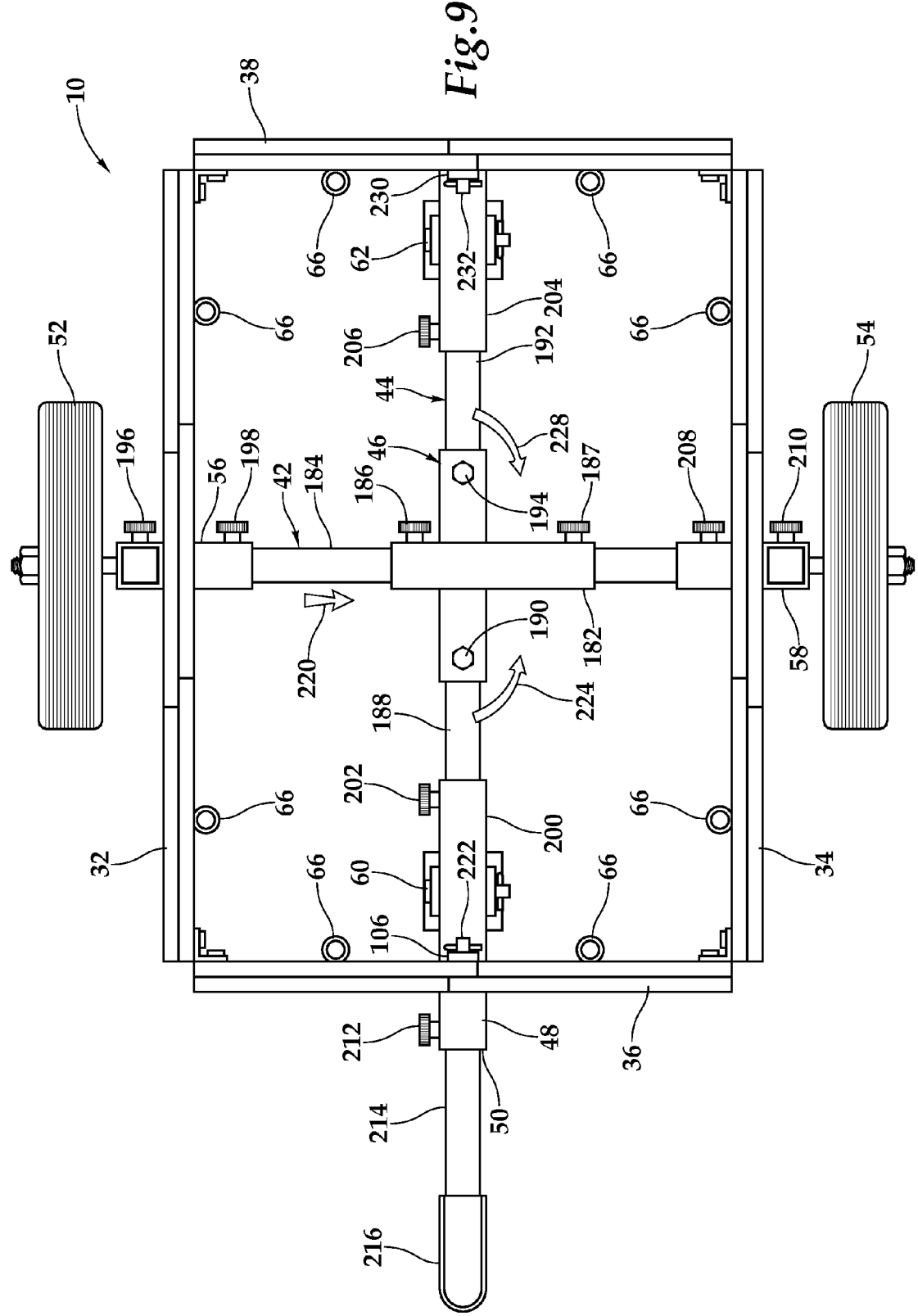
FIG. 9 is a top plan view of the collapsible trailer being collapsed.

FIG. 9 depicts the collapsible trailer transitioning from an expanded position 12 to a collapsed position 80. In operation, the meshed netting 24 has been released from engagement with the four sides 32-38 of the jointed lattice-work frame. As mentioned, the collapsible trailer 10 may be quickly assembled for hauling and disassembled for storage. Since all four sides 32-38 of the collapsible platform 10 comprise jointed lattice-work, the collapsible platform 10 is expandable and collapsible both lengthwise and width wise, that is, within a plane defined by two axes; namely, an axis coincident with the crossbar 42 and an axis coincident with the crossbar 44. Prior to collapsing the lattice-work frame, the collapsible crossbars 42, 44 and associated components must be disassembled. Before discussing the disassembly and collapsing procedures, a more detailed examination at the components of the collapsible crossbars 42, 44 is provided.

As illustrated, the collapsible crossbar 44 is orthogonally coupled to the collapsible crossbar 42 by a cross support member 182 disposed at the junction 46. An extension member 184 of the collapsible crossbar 42 telescopes into the cross support member 182 and may be releasably secured in place by fitting head 186, which may be tightened or loosened by turning. Additionally, in one implementation, a fitting head 187 adds further telescoping capabilities with a second extension member (unnumbered) disposed opposite to the extension member 184. The collapsible crossbar 44 includes an arm 188 which rotatably turns about pin 190 toward the cross support member 182. Similarly, an arm 192 is oppositely disposed from the arm 188 to rotatably turn about pin 194. The wheel hub assembly 56 includes a fitting head 196 for adjusting the height of the wheel 52 as discussed in FIG. 7. Additionally, a fitting head 198 is provided and adapted for securing extension member 184 therein. The wheel hub assembly 58 includes a similar design having a fitting head 210 for adjusting the height of the wheel 54 and a fitting head 208 adapted for securing collapsible crossbar 42 therein.

Housing 200 of the collapsible crossbar 44, which has auxiliary wheel assembly 60 releasably secured thereto, accepts and secures the arm 188 therein by the use of a fitting head 202. As shown, a portion of the housing 200, the hitch assembly 48, extends through the front 36 and includes fitting head 212 for accepting, as previously discussed, various accessories within receptacle 50. Further, the bracket 106 and pin 222 secure the housing 200 to the interior of the front 36. As shown, an extension member 214 having a hitch 216 disposed at the end is adapted to be received in the receptacle 50 and secured by the fitting head 212. Housing 204 to which auxiliary wheel assembly 62 is releasably coupled, includes a fitting head 206 for securing the arm 192 as well as a bracket 230 with a pin 232 for securing the housing 204 to the rear 38 of the collapsible trailer 10. In one implementation the collapsible crossbars 42, 44 releasably engage brackets associated with the wheel hub assemblies 56, 58 and the housings 200, 204, respectively. In this arrangement, the fitting heads 186, 187, 198, 202, and 206, for example, include respective mounting pins adapted for releasably engaging respective alignment holes associated with the wheel hub assemblies 56, 58 and the housings 200, 204.

In operation, the auxiliary wheel assemblies 60, 62 are decoupled from the collapsible trailer 10. The collapsible crossbar 42 is then released from engagement with the sides 32, 34 by untightening the fitting heads 198, 208. Likewise, the collapsible crossbar 44 is released from engagement from the front 36 by initially releasing fitting head 202 and fitting head 212. The hitch assembly 48 and the hitch 216 may then be separated from the collapsible trailer 10 and the arm 188 is freed. The pin 222 is removed from bracket 106 to completely decouple the housing 200. Similarly, the housing 204 is separated from the rear 38 of the collapsible trailer 10 and the arm 192 is made moveable by loosening the fitting head 206 and removing the pin 232 from the bracket 230.

The collapsible crossbars 42, 44 are then collapsed by telescoping the extension member 184 into the support member 182 as shown by arrow 220. The arms 188, 192, which are extensions of the collapsible crossbar 44, are rotatably turned toward the support member 182, which may be considered a second extension, at two separate joints 190, 194 as shown by arrows 224, 228. The collapsible crossbars 42, 44 are then removed from the open enclosure 40. It should be understood that the exact methodology of collapsing the collapsible trailer 10 may vary from that which is presented herein and steps may be simultaneously or in a different order than that presented.

FIGS. 10 and 11 depict the front 36 of the collapsible trailer 10 transitioning from the expanded position 12 to the collapsed position 80. The side 36 includes two scissor linkage units formed by scissor linkages 82, 86 and scissor linkages 84, 88, respectively, pivotally connected in a series. As discussed, each of the two scissor linkage units includes a pair of equal length linkages pivotally connected at approximately mid-points by a pin. As illustrated by arrows 240, 242 the scissor linkage units are collapsed inward from the expanded position 12 illustrated in FIG. 10 to the collapsed position 80 pictured in FIG. 11.

Figure 12:
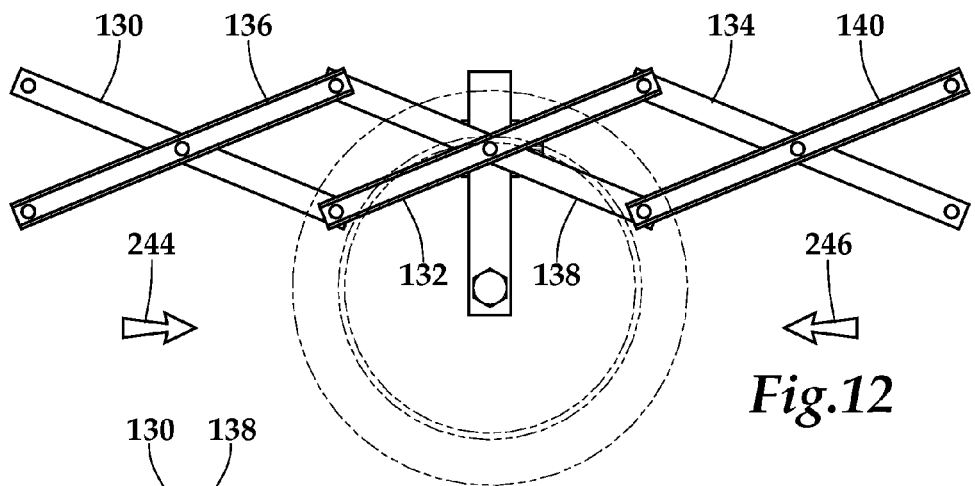
FIG. 12 is a side exterior plan view of the collapsible trailer configured in an expanded position.
Figure 13:
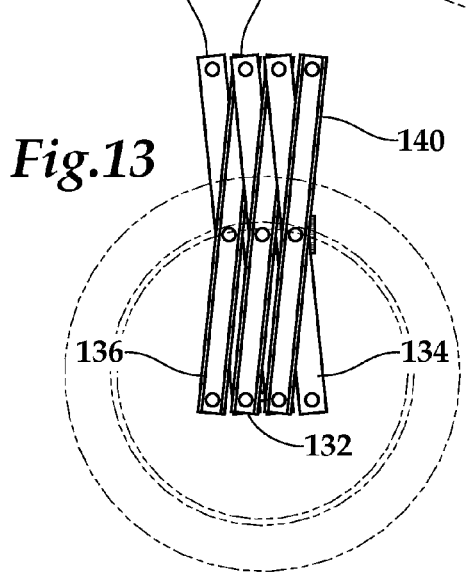
FIG. 13 is a side exterior plan view of the collapsible trailer configured in a collapsed position wherein a portion of the components are ghosted.

Similarly, FIGS. 12 and 13 together depict the side 32 of the collapsible trailer 10 transitioning from an expanded position 12 in FIG. 12 to a collapsed position 80 in FIG. 13. The side 32 includes three scissor linkage units; namely the unit formed by scissor linkages 130, 136; scissor linkages 132, 138; and scissor linkages 134, 140. Each of the scissor linkages 130-140 are pivotally connected in a series and foldable in the direction indicated by the arrows 244, 246. It should be understood by those skilled in the art that assembly of the collapsible trailer 10 form the collapsed configuration 80 to the expanded configuration 12 is accomplished in the opposite manner as discussed herein. It should be appreciated that the components and design of the collapsible crossbars 42, 44 may vary from that presented herein and other arrangements are within the teachings presented herein.

Figure 14:
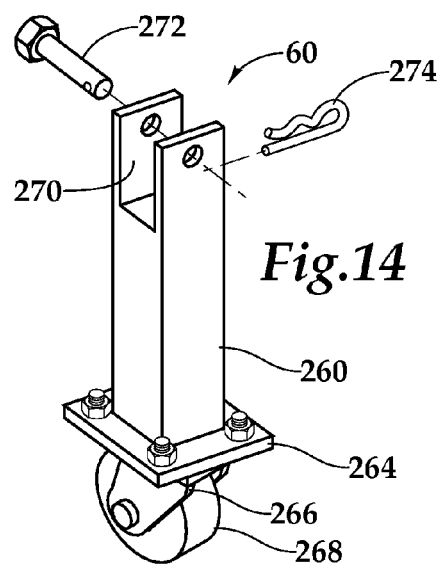
FIG. 14 is a perspective view of one embodiment of an auxiliary wheel which may utilized in conjunction with the collapsible trailer.
Figure 15:
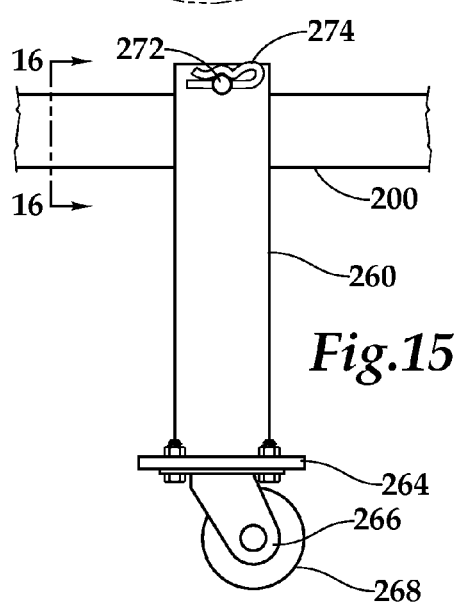
FIG. 15 is a side view of one embodiment of the auxiliary wheel coupled to the collapsible trailer.
Figure 16:
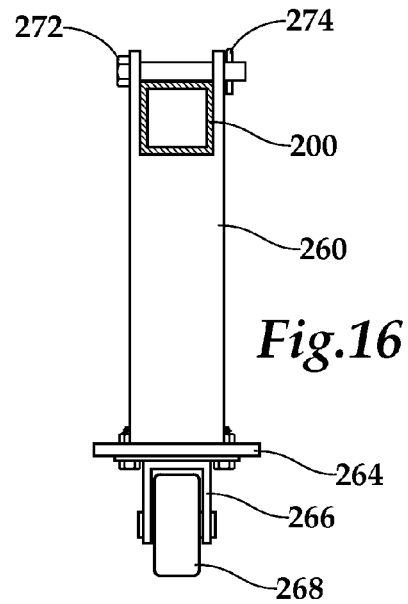
FIG. 16 is a cross sectional view of the auxiliary wheel taken along line 16-16 of FIG. 15.

FIGS. 14 through 16 together depict one embodiment of the auxiliary wheel assembly 60 which may utilized in conjunction with the collapsible trailer 10. The U-shaped auxiliary wheel frame 260 includes an auxiliary wheel 268 which extends from and is fixedly set at a level proximate to the wheels 52, 54. More particularly, the U-shaped auxiliary wheel frame 260 is mounted to base 264 to which guide arms 266 and the wheel 268 are mounted thereto. A receptacle 270 disposed in the frame 260 is adapted to accommodate collapsible crossbar 44 and bolt 272 and pin 274 secure the auxiliary wheel 60 thereto. With this configuration, the auxiliary wheel 60 may be releasably coupled and adjustable secured to the collapsible crossbar 44 as required by the specific application.

Figure 17:
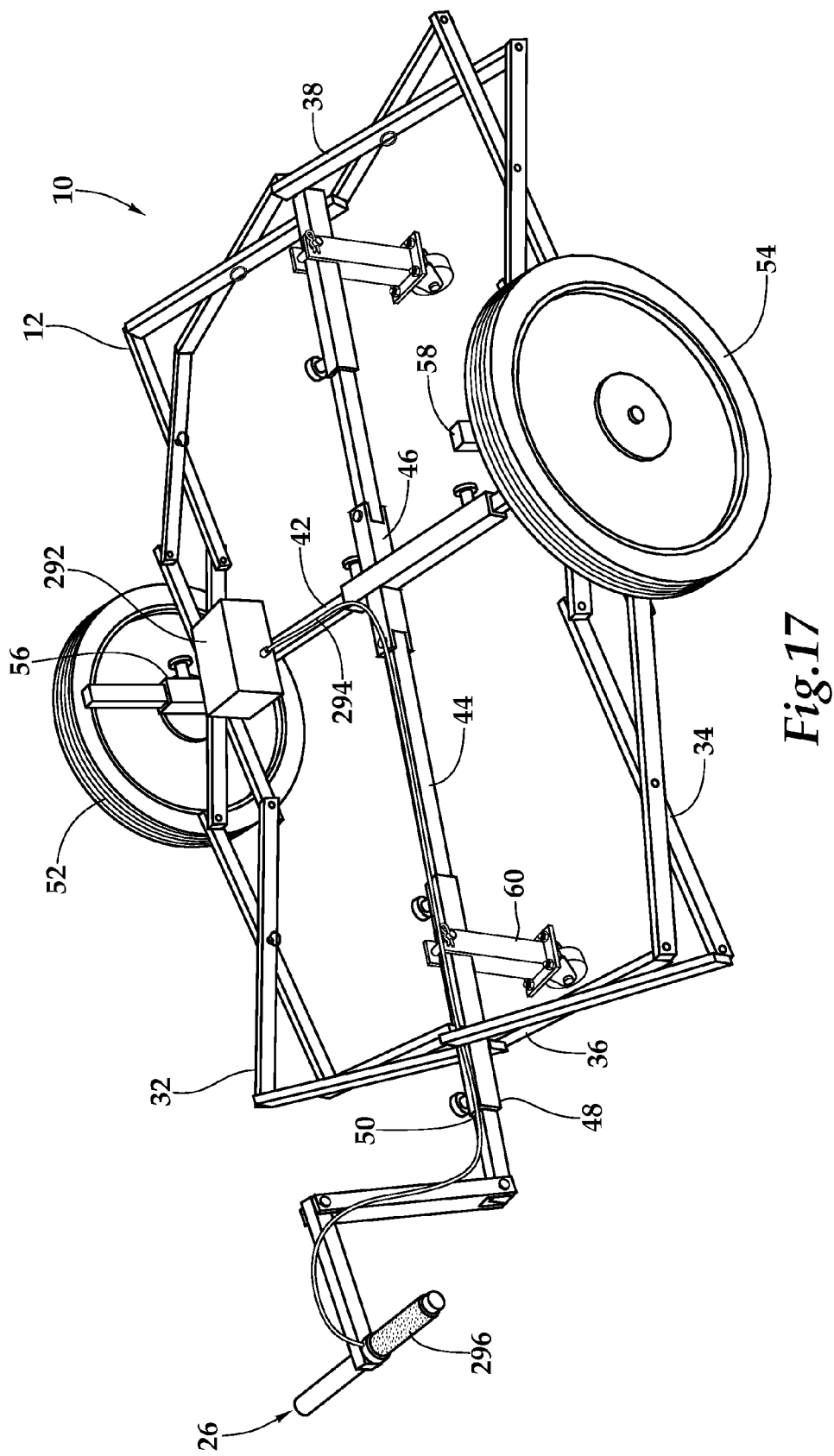
FIG. 17 is a perspective view of another embodiment of the collapsible trailer which incorporates a motor for providing auxiliary power.

FIG. 17 depicts another embodiment of the collapsible trailer 10 which incorporates a motor 292 for providing auxiliary power to the wheel 52. The motor 292 is connected to the wheel hub assembly 56 and the axle of the wheel 52 in order to directly supply supplementary rational torque thereto. A control cable 294 connects the motor 292 and a controller 296 positioned at the handle 26. As shown, the control cable 294 is secured to the crossbars 42, 44. The motor 292 may be a battery powered electric motor that when actuated converts electricity into rotational torque for application to the axle associated with the wheel 52.

By way of further example, the motor 292 may comprise a mainspring that has two operational modes. In a first operational mode, the controller 296 is not actuated and mainspring stores the energy of rotation supplied by the wheel 52 during normal use to store supply a supplemental supply. In the second operational mode, the controller 296 is actuated and the stored supply of energy is released to supply rotational torque to the wheel 52. Such a mainspring may be a long strip of hardened steel, high elastic limit alloy spiral coiled inside a barrel.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A collapsible trailer comprising:
    a jointed lattice-work frame defining four sides, each of the four sides including a plurality of scissor linkages being configured in an expanded position and slidably expandable and collapsible in an accordion fashion between the expanded position defining an open enclosure and a collapsed position defining a closed enclosure;
    first and second wheel hub assemblies respectively disposed on first opposing sides of the four sides;
    first and second wheels respectively rotatably mounted to the first and second wheel hub assemblies;
    a first collapsible crossbar releasably engaged with the first wheel hub assembly and the second wheel hub assembly, the first collapsible crossbar spanning the open enclosure therebetween;
    a second collapsible crossbar orthogonally coupled to the first collapsible crossbar, the second collapsible crossbar releasably engaging second opposing sides of the four sides and spanning the open enclosure therebetween;
    a receptacle formed at an end of the second collapsible crossbar, the receptacle adapted to releasably accept an accessory selected from the group consisting of a trailer hitch and a tow bar; and
    a support platform defined by a meshed netting releasably engaging each of the four sides and spanning the open enclosure therebetween such that the support platform is superposed to the first and second collapsible crossbars.

2. The collapsible trailer as recited in claim 1, wherein the first opposing sides each further comprise three scissor linkage units pivotally connected in a series.

3. The collapsible trailer as recited in claim 2, wherein each of the three scissor linkage units further comprise a pair of equal length linkages pivotally connected at approximately mid-points by a pin.

4. The collapsible trailer as recited in claim 1, wherein the second opposing sides each further comprise two scissor linkage units pivotally connected in a series.

5. The collapsible trailer as recited in claim 4, wherein the second collapsible crossbar intersects and extends beyond an opening formed at the connection of the two scissor linkage units.

6. The collapsible trailer as recited in claim 5, wherein a portion of the second collapsible crossbar which extends beyond the opening further comprises an articulated joint that is adapted to fold the second collapsible crossbar upon itself.

7. The collapsible trailer as recited in claim 1, wherein the first wheel hub assembly further comprises:
    a vertical arm including an axle assembly coupling the first wheel thereto and a plurality of vertically spaced alignment holes therethrough; and
    a housing having a mating pin mounted therethrough, the housing adapted to slidably accept the vertical arm therein, thereby brining the housing and vertical arm into an adjustable mating engagement upon the alignment of one of the plurality of vertically spaced alignment holes and the mating pin.

8. The collapsible trailer as recited in claim 1, wherein the first collapsible crossbar further comprises first and second brackets including respective mounting pins, the mounting pins adapted for releasably engaging respective alignment holes associated with the first opposing sides.

9. The collapsible trailer as recited in claim 1, wherein the second collapsible crossbar further comprises first and second brackets including respective mounting pins, the mounting pins adapted for releasably engaging respective alignment holes associated with the second opposing sides.

10. The collapsible trailer as recited in claim 1, wherein the second collapsible crossbar is orthogonally coupled to the first collapsible crossbar by a cross support.

11. The collapsible trailer as recited in claim 10, wherein an extension of the first collapsible crossbar telescopes into the cross support.

12. The collapsible trailer as recited in claim 10, wherein the second collapsible crossbar rotatably turns in two locations toward an extension of the first collapsible crossbar.

13. The collapsible trailer as recited in claim 1, further comprising an auxiliary wheel assembly including a U-shaped auxiliary wheel frame adjustably secured to one of the first collapsible crossbar and the second collapsible crossbar, the U-shaped auxiliary wheel frame including an auxiliary wheel which extends from and is fixedly set at a level proximate to the first and second wheels.

14. The collapsible trailer as recited in claim 1, further comprising a motor for providing auxiliary rotary power to the first wheel.

15. A method for using a collapsible trailer, the method comprising:
    releasing a meshed netting from engagement with four sides of a jointed lattice-work frame of the collapsible trailer, the jointed lattice-work including a plurality of scissor linkages being configured in an expanded position, the meshed netting spanning an open enclosure defined by an interior of the jointed lattice work frame;
    releasing a first collapsible crossbar of the collapsible trailer from engagement with first opposing sides of the four sides, the first collapsible crossbar spanning the open enclosure;
    releasing a second collapsible crossbar of the collapsible trailer from engagement with second opposing sides of the four sides, the second collapsible crossbar spanning the open enclosure;
    collapsing the first and second collapsible crossbars;
    removing the first and second collapsible crossbars from the open enclosure; and
    slidably collapsing the four sides of the jointed lattice work frame in an accordion fashion to configure the collapsible trailer in a collapsed position.

16. The method as recited in claim 15, wherein releasing a first collapsible crossbar from engagement further comprises disengaging a mounting pin adapted to releasably engage respective alignment holes associated with a bracket of the first collapsible crossbar and the jointed lattice-work frame.

17. The method as recited in claim 15, wherein removing the first and second collapsible crossbars from the open enclosure further comprises:

telescoping a first extension of the first collapsible crossbar into a cross support disposed at an orthogonal intersection of the first and second collapsible crossbars; and rotatably turning the second collapsible crossbar toward a second extension of the first collapsible at two separate joints.

18. A collapsible trailer comprising:

a meshed netting spanning an open enclosure defined by an interior of a jointed lattice work frame with means for releasing the meshed netting from engagement with four sides of the jointed lattice-work frame, said frame including a plurality of scissor linkages being configured in an expanded position;

a first collapsible crossbar spanning the open enclosure with means for releasing the first collapsible crossbar from engagement with first opposing sides of the four sides;

a second collapsible crossbar spanning the open enclosure with means for releasing the second collapsible crossbar from engagement with second opposing sides of the four sides;

means for collapsing the first and second collapsible crossbars;

means for removing the first and second collapsible crossbars from the open enclosure; and means for slidably collapsing the four sides of the jointed lattice work frame in an accordion fashion to configure the collapsible trailer in a collapsed position.

19. The collapsible crossbar as recited in claim 18, wherein the means for releasing a first collapsible crossbar from engagement further comprises means for disengaging a mounting pin adapted to releasably engage respective alignment holes associated with a bracket of the first collapsible crossbar and the jointed lattice-work frame.

20. The collapsible crossbar as recited in claim 18, wherein the means for removing the first and second collapsible crossbars from the open enclosure further comprises:

means for telescoping a first extension of the first collapsible crossbar into a cross support disposed at an orthogonal intersection of the first and second collapsible crossbars; and means for rotatably turning the second collapsible crossbar toward a second extension of the first collapsible at two separate joints.

* * * * *